Aug. 2, 1927. 1,637,824
J. F. HIDZICK
WIRE CUTTING MACHINE
Filed March 29 1926 5 Sheets-Sheet 1
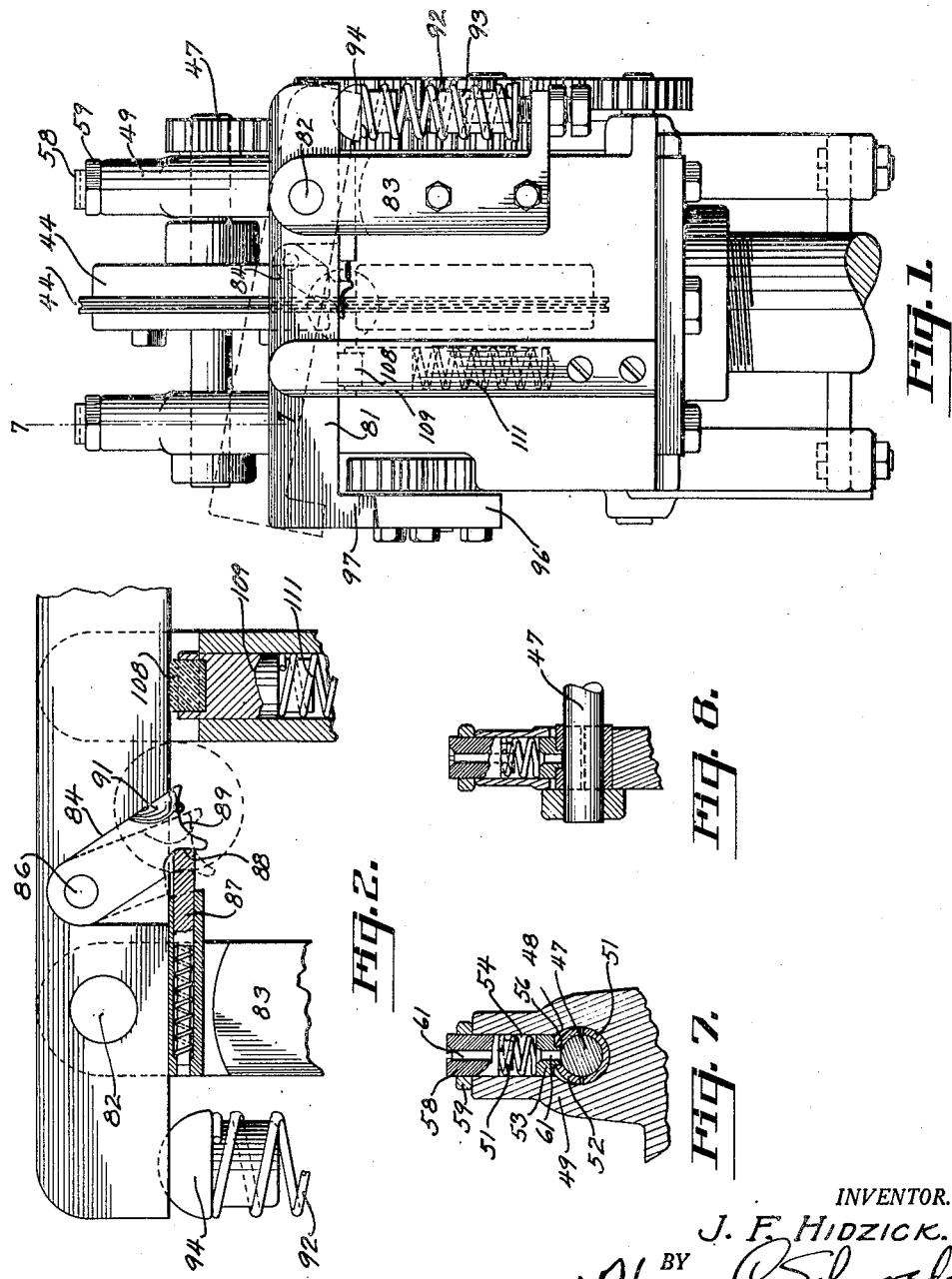
INVENTOR.
J. F. HIDZICK.
BY Harry C. Schroeder
ATTORNEYS.

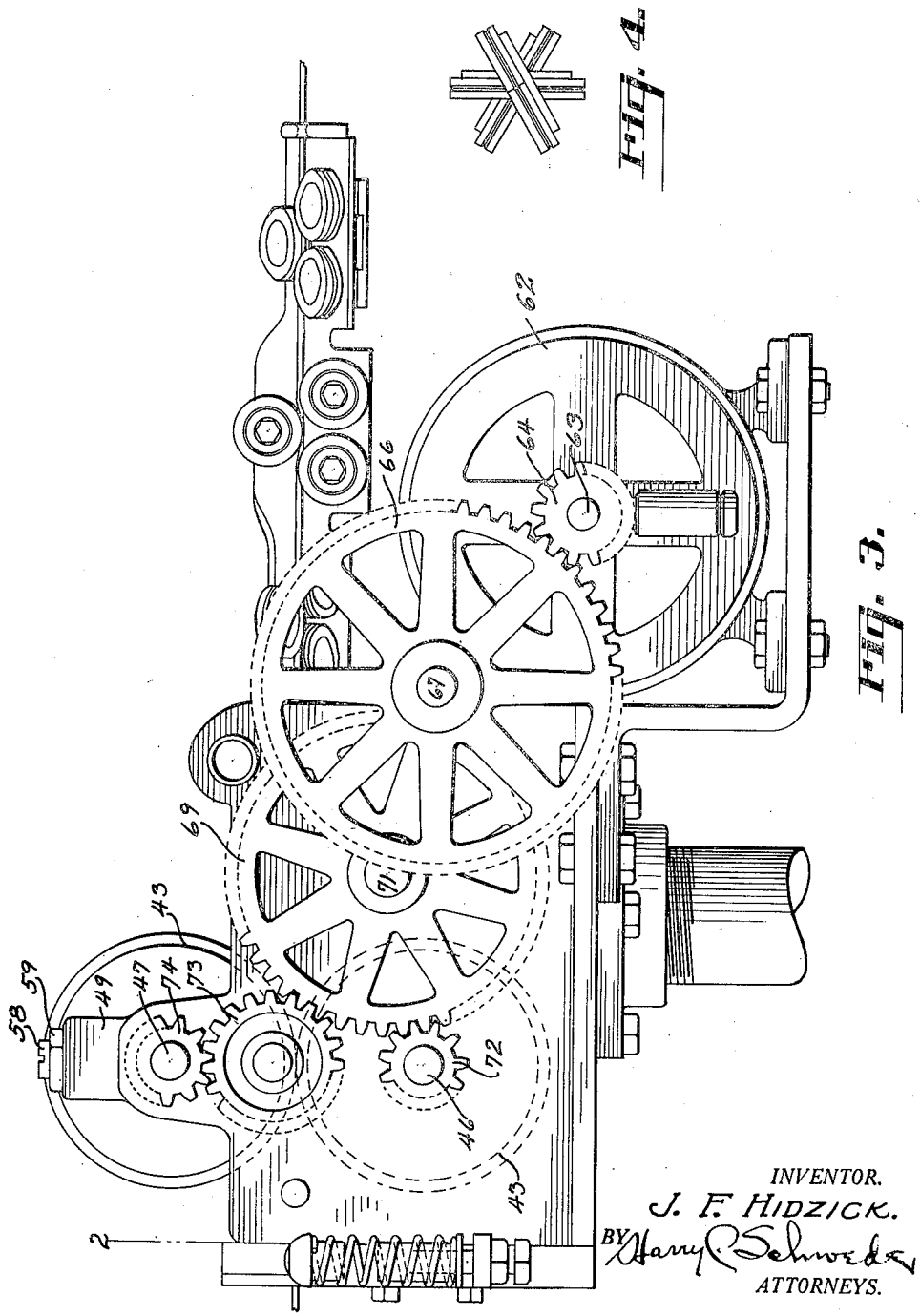

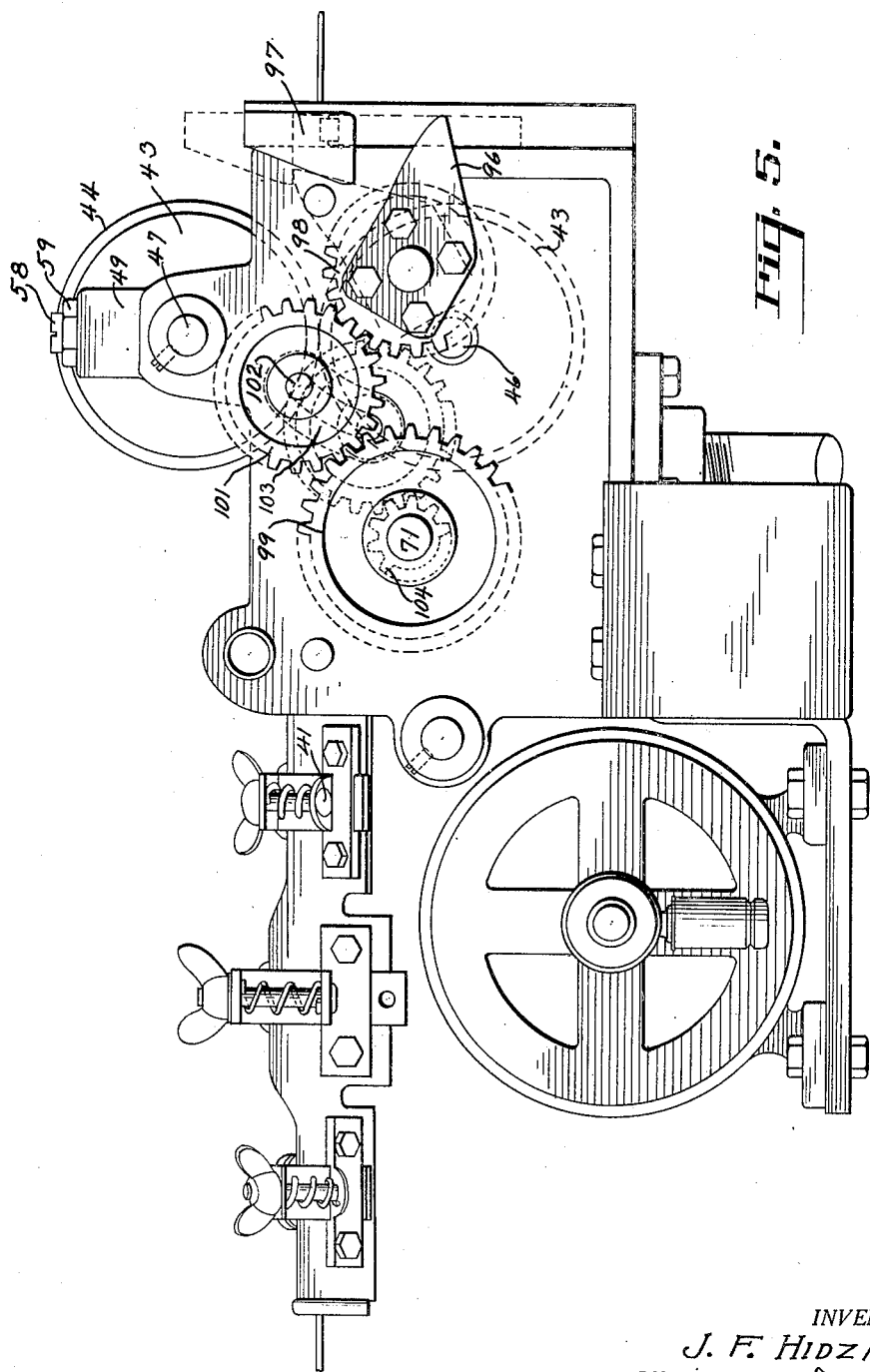

Aug. 2, 1927.
J. F. HIDZICK
1,637,824
WIRE CUTTING MACHINE
Filed March 29 1926  5 Sheets-Sheet 4
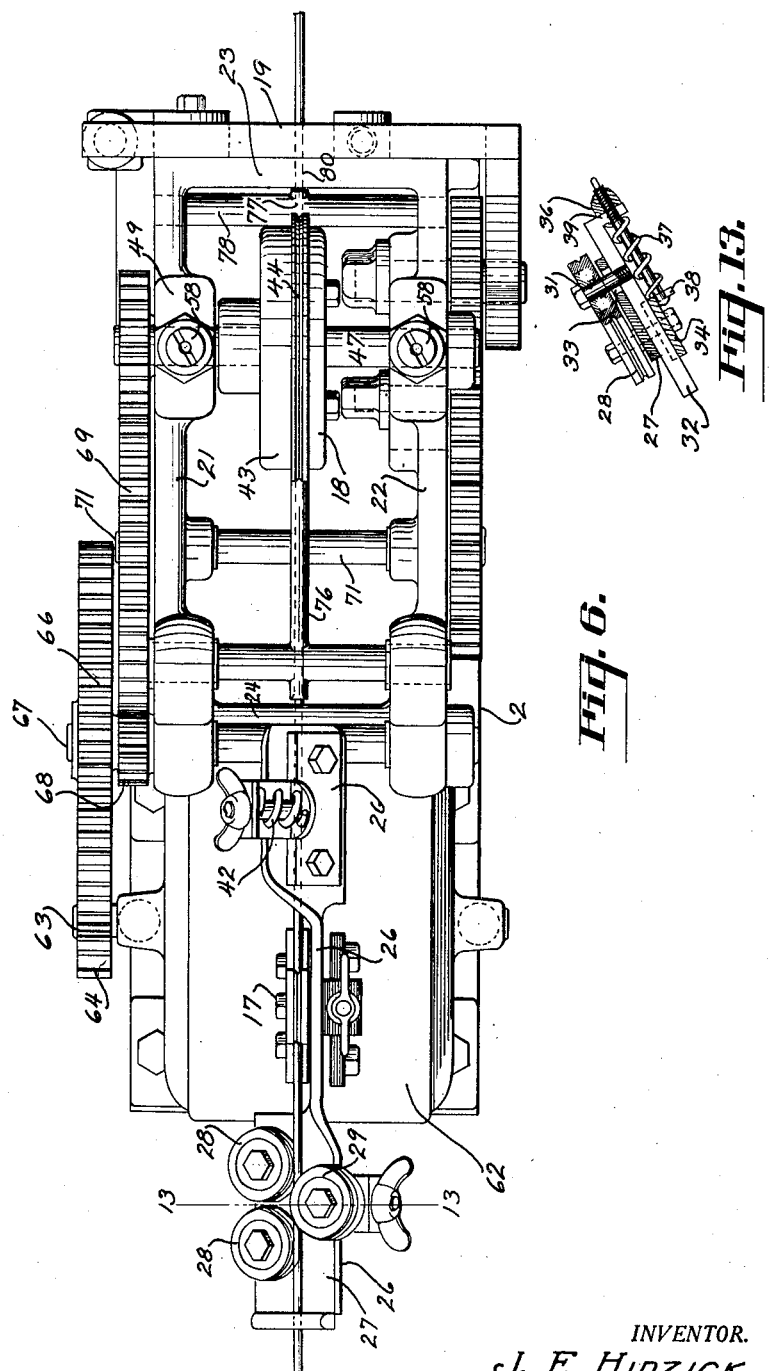
INVENTOR.
J. F. HIDZICK.
BY
Harry C. Schweky
ATTORNEYS.

Aug. 2, 1927.

J. F. HIDZICK

WIRE CUTTING MACHINE

Filed March 29 1926   5 Sheets-Sheet 5

1,637,824

INVENTOR.
J. F. HIDZICK.
BY
ATTORNEYS.

Patented Aug. 2, 1927.

1,637,824

UNITED STATES PATENT OFFICE.

JOSEPH F. HIDZICK, OF SAN FRANCISCO, CALIFORNIA.

WIRE-CUTTING MACHINE.

Application filed March 29, 1926. Serial No. 98,312.

The present invention relates to improvements in wire cutting machines and has for its principal object to provide a machine of the character described which allows a spool of wire to be cut into desired lengths in one continuous operation.

A further object of the invention is to provide a machine of this character that is very compact and in which all the operative parts are assembled into one compact unit.

A further object of the invention is to arrange the wire cutting device in such a manner that the cutting does not interfere with a continuous advance of the wire and does not require a stopping or intermittent advance.

A further object of the invention is to combine into a compact unit with the wire advance and wire cutting device, a means for straightening the wire from a spool.

A further object of the invention is to provide means whereby the wire may be conveniently fed from a spool without any danger of twisting the individual turns of the spool.

A further object of the invention is to provide a convenient means whereby the device may be readily changed for producing lengths of different size.

Further objects and advantages of my device will appear as the specification proceeds.

Figure 10:
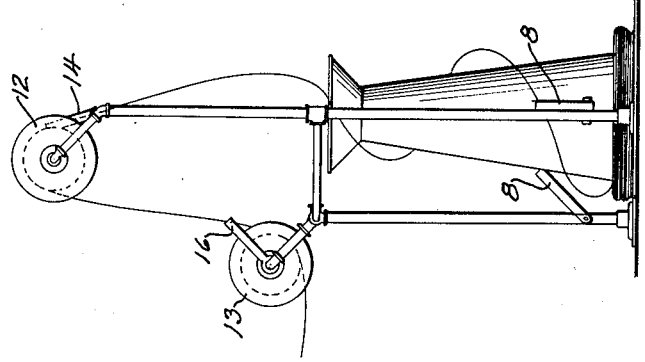
Figure 9:
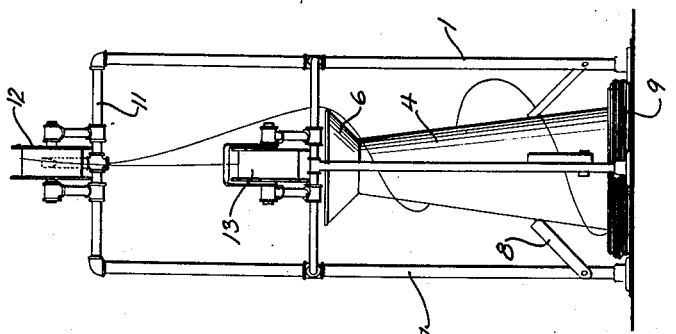
Figure 11:
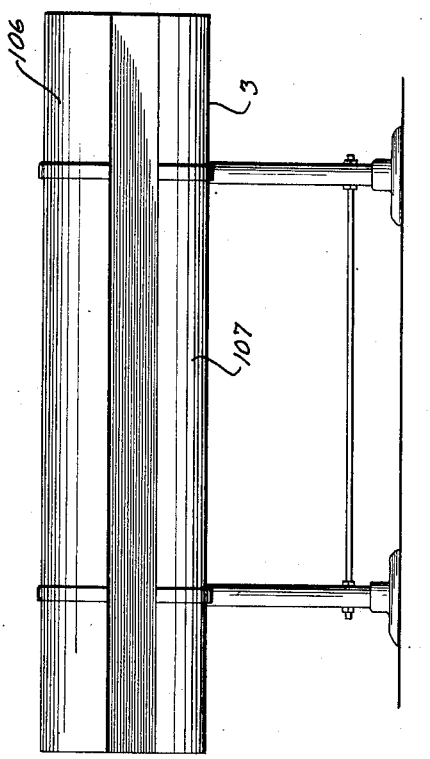
Figure 12:
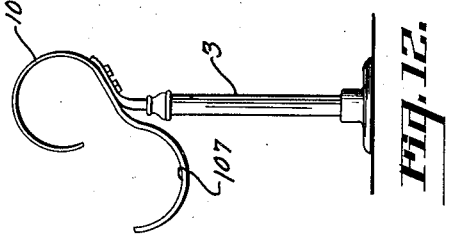

The preferred form of my invention is illustrated in the accompanying drawings in which:

Fig. 1 shows an end view of my machine,
Fig. 2 a sectional detail view showing the cutting device from the rear as seen from line 2—2 of Fig. 3,
Fig. 3 a side elevation of the machine,
Fig. 4 a schematic end view of the straightening device,
Fig. 5 a side elevation taken from the opposite side to that of Fig. 3,
Fig. 6 a top plan view,
Fig. 7 a detail view in section of a bearing taken along lines 7—7 of Fig. 1,
Fig. 8 a section taken at right angles to that of Fig. 7,
Fig. 9 an end view of a wire extension device,
Fig. 10 a side view thereof,
Fig. 11 a side view of a receiving device,
Fig. 12 an end view thereof, and
Fig. 13 a detail sectional view of the straightening device taken along line 13—13 of Fig. 6.

While I have shown only the preferred form of the invention I wish to have it understood that various changes or modifications may be made within the scope of the claims attached hereto without departing from the spirit of the invention.

In its preferred form my device comprises three units, namely—the wire dispensing device 1 illustrated in Figs. 9 and 10, the wire cutting device 2 illustrated particularly well in Figs. 1 to 8 and the wire receiving device 3 illustrated in Figs. 11 and 12.

The wire dispensing device 1 comprises a conical standard 4 terminating at the top in an inverted cone 6 and a frame 7 partly surrounding the standard, having a plurality of dogs 8 pivoted thereto in such a manner that the dogs lie against the standard in an upward slanting position. The standard is dimensioned to allow a spool 9 of wire to lie around the same, the dogs 8 being intended to substantially maintain the individual turns of the spool in an operative relation and to prevent individual turns of the spool from disorganizing the proper feeding thereof. The frame 7 is provided with a cross-member 11 above the standard and a pulley 12 is supported above the cross-member while a second pulley 13 is provided in the frame substantially at the height of the cutting device to be described hereinafter. One end of the wire is guided through a tube 14 over the pulley 12 and through a perforation in a fixed yoke 16 under the pulley 13 toward the cutting device.

The cutting device involves three principal features, namely—a straightening device 17, a wire advancing device 18 and a wire cutting device 19. These three devices are mounted as one unit in a frame comprising two parallel side members 21 and 22 and end members 23 and 24. The straightening device 17 includes a plurality (in the case illustrated 3) of units 26 engaging the advancing wire in three different planes 120° apart. Each of these units comprises a plate 27 having two grooved pulleys 28 arranged along one edge thereof and a third pulley 29 adapted to engage a passing wire from the opposite side and to force the same into the cavity left between the two first pulleys. The third pulley is preferably arranged with freedom of adjustment as shown in Fig. 13 and may be supported on a pin 31 extending from a bar 32 and riding in a slot 33 in the plate 27. The bar 32 slides in a lug 34 extending from the bottom face of plate 27 and may be adjusted by means of a nut 36 threaded on a rod 37 passing through flanges 38 and 39 of the lug 34 and the bar 32 respectively; a head 41 on the rod 37 bearing on the flange 38 and a spring 42 tending to spread the two flanges apart. The plate 27 forming the basis of the three units may be made of one piece twisted in the manner illustrated particularly well in Fig. 6.

The wire advancing device comprises two large pulleys 43 mounted one above the other and provided with small peripheral grooves 44 adapted to grip the wire. The lower one of the two pulleys 43 is supported on a transverse shaft 46 and the upper one on a transverse shaft 47, the latter shaft being mounted with freedom of slight vertical motion for adapting the device for wires of slightly different diameters. The particular method developed by me for mounting the shaft 47 is illustrated in Figs. 7 and 8 and includes a slightly oblong perforation 48 in the supporting member 49, the perforation being oblong along a vertical diameter. One section 51 of a split bushing occupies the lower portion of the perforation and the second section 52 of the bushing occupies the upper portion of the perforation the latter section being centered by a block 53 sliding in a vertical passage 54 communicating with perforation 48 and engaging with the section 52 by means of a projection 56. A spring 57 bears on the block 53 and is held by means of a set screw 58 adapted to be locked by a nut 59. Vertical bores 61 in the block 53 and the set screw 58 allow oil to be applied to the bearing.

Rotary motion is imparted to the two pulleys 43 from a motor 62 through a train of gears mounted on one side of the frame and illustrated in Figure 3. The motor shaft 63 has a pinion 64 thereon meshing with a gear wheel 66 on the transverse shaft 67 which latter transmits motion through a pinion 68 and the gear wheel 69 to the shaft 71, the gear wheel 69 driving the lower pulley 43 through a pinion 72 on the shaft 46 and the upper pulley 43 through an idler 73 and the pinion 74 on the shaft 47. Before reaching the two pulleys 43 the wire is guided through a pipe 76 and after leaving the two pulleys it passes through a perforation 77 in a transverse element 78 guided in the frame with freedom of rocking motion, whereupon it advances through a rather close fitting perforation 80 in the end frame member 23 to be cut when leaving the same.

The cutting device 19 comprises a lever 81 pivoted on a pin 82 supported in the frame member 23 and a bracket 83, the pin 82 being arranged at a lateral distance from the advancing wire. A dog 84 is pivoted to the lever as at 86, also at a horizontal distance from the advancing wire, a spring operated plunger 87 engaging the lower end of the dog as at 88 and forcing the said end into the vertical plane of the wire. The bottom face of the dog is concaved as shown at 89 and is provided with a sharp cutting edge next to the end member 23 so that when the lever 81 is forced outwardly with the bottom face of the dog engaging the wire, the cutting edge next to the frame member 23 cuts the wire, a recess 91 being provided immediately above the cutting edge to allow the advancing wire to be accommodated therein. The downward motion of the lever causes the dog to clear the wire altogether so that thereafter the wire rides along the upper edge of the dog as indicated in dotted lines in Fig. 2, the recess 91 being provided for the sole purpose of accommodating the advancing wire during the interim and before the dog clears the wire altogether. The rising of the lever causes the bottom edge of the dog to gradually rise above the wire and to return to the original full line position of Fig. 2 due to the action of the spring-operated plunger 87. The lever 81 is actuated at one end by the spring 92 bearing on the adjustable pin 93 and pressing the head 94 against the underface of one end of the lever 81. The other end of the lever is actuated by means of a revolving cam 96 illustrated particularly well in Fig. 5, the cam co-operating with a flange 97 descending from the extreme end of the lever 81. The cam 96 is fixed to a gear wheel 98 which latter receives rotary motion from the shaft 71 previously mentioned through a gear wheel 99 and an idler 101.

The latter is mounted on a jack shaft 102 riding in an arcuate slot 103, the arc of the latter having the axis of the gear wheel 98 for its center. This arrangement allows the gear wheel 99 to be interchanged with other gear wheels of different diameter as for instance the gear wheel 104 shown in dotted lines for changing the speed of the cam 96. When a smaller gear wheel like 104 is substituted for the larger gear wheel 99 the idler 101 drops into the position shown in dotted lines. The revolving cam slowly raises the lever 81 until it trips the same when the spring 92 forces the lever downward for quick cutting action.

The advancing wire is received in the guard 106 of the receiving device 3 which latter is alined with the wire in the cutting device and drops from there after being cut, into the trough 107.

The operation of my device will be readily understood from the foregoing description. A spool of wire to be cut in lengths of the same size is placed on the standard 4 in the manner illustrated in Figs. 9 and 10. One end of the wire is guided to the pulley 12 through the guide 14, from there through the yoke 16 around the pulley 13, the three units of the straightening device, the guide 76 between the pulley 43 through the perforation 77 in the member 78 and through the perforation in the end member 23. The starting of the motor causes the pulleys 43 to advance the wire and at the same time causes the cam 96 to revolve and to periodically raise the lever 81 which after being tripped is forced downward with a quick cutting motion by a spring 92. The dog 84 assumes, during the upward travel of the lever 81, the position shown in full lines in Fig. 2 and on the downward motion of the lever cuts the wire without interfering with the advance thereof, the advancing wire being accommodated, immediately after the cutting action is completed, in the recess 91, and immediately thereafter clearing the dog which moves into the dotted line position of Fig. 2 at the end of the downward travel of the lever 81. As the cam causes the lever to rise the dog gradually rises above the wire and is forced back into the full-line position of Fig. 2 by the plunger 87. The time period of the cam and thereby the length of the cut wires may be adjusted by substituting different sized gear wheels for the wheel 99. The two pulleys automatically adjust themselves to slight differences in the diameter of the wire to be cut due to the particular construction of the bearings supported in the shaft 47. The shock of the descending lever 81 may be absorbed by the block 108 supported in a recess 109 by means of a spring 111.

I claim:

1. In a wire cutting device of the character described, means for freely supporting a spool of wire, means engaging one end thereof for unwinding the wire from the spool, and means interposed between the spool and the unwinding device for straightening the wire, said straightening device comprising a plurality of units affecting the advancing wire in planes disposed at angles to one another.

2. Means for cutting a continuously advancing strand of wire, comprising means for guiding the wire, a dog suspended to normally clear the wire, yielding means for pushing the lower end of the dog into cutting relation to the wire, and means for periodically depressing the dog whereby the latter is made to cut the wire and to clear the same immediately after the completion of the cutting action.

3. A device as defined in claim 2, in which the dog is formed to recede from its cutting edge to allow the wire to advance before the same is cleared by the dog altogether.

4. Means for cutting a continuously advancing strand of wire, comprising means for guiding the wire, a lever overlying the wire having a dog suspended therefrom normally clearing the wire, yielding means pushing the lower end of the dog into cutting relation to the wire, and means for periodically depressing the lever whereby the dog is made to cut the wire and to clear the same immediately after the completion of the cutting action.

5. A device as defined in claim 4, in which the dog is formed to recede from its cutting edge to allow the wire to advance before the same is cleared by the dog altogether.

6. A device as defined in claim 4, in which a spring operates one end of the lever and a cam the other end, placing the spring under tension and periodically releasing the same.

7. A device as defined in claim 4, in which a cam driven by a chain of gears operates the lever periodically, and in which adjusting means are associated with the chain of gears to allow the time periods to be changed.

8. A device as defined in claim 4, in which yielding means are provided for absorbing the shock of the descending lever after the cutting action is completed.

9. In a device of the character described, two parallel frame elements, two pulleys supported between the same and adapted to co-operate in advancing a strand of wire, a train of gears on the outside of one frame element for driving the pulleys, a transverse cutting element at the rear end of the device adapted to periodically cut the advancing wire, a cam operating the cutting element, and a gear train on the outside of the second frame element for driving the cam at a different speed.

10. A device as defined in claim 9, in which a wire straightening device is supported in front of the pulleys.

11. A device as defined in claim 9, in which a wire straightening device is supported in front of the pulleys, and in which tubular members are provided for guiding the straightened wire on opposite ends of the pulleys.

12. In a wire cutting device of the character described, a conical standard allowing a spool of wire to encircle the bottom thereof, a frame surrounding the standard and the spool of wire having dogs pivoted thereto adapted to lie against the conical standard above the spool, and a pulley supported in the frame allowing one end of the wire to be guided thereover, the dogs serving to maintain the threads of the spool in proper relation for unwinding.

13. A device as defined in claim 12, in which the conical standard terminates in an inverted cone for guiding the wire.

14. In a device of the character described, a cutter operating lever, a revolving cam periodically raising and dropping the lever, a gear-wheel fixed to the cam, a second gear-wheel spaced therefrom having means for revolving the same co-operating therewith, and a third gear-wheel having an axial shaft mounted in an arcuate slot and adapted to mesh with the first and second wheels for transmitting motion from one to the other, the slot allowing the second gear-wheel to maintain its transmitting function when a different sized gear-wheel is substituted for the second one for changing the time period of the cam.

15. In a wire cutting machine of the character described, means for successively cutting predetermined lengths from an advancing wire, and a receiving device for the said lengths comprising an elongated guard supported in alinement with the advancing wire so as to allow the latter to enter the same before being cut, and a trough communicating with the guard and arranged to allow the length of wire to drop thereinto after being cut.

16. A device as defined in claim 15, in which the guard is annular in cross-section and in which the trough is arranged alongside thereof and below the same.

In testimony whereof I affix my signature.

JOSEPH F. HIDZICK.